(12) United States Patent  
Ostrander et al.

(10) Patent No.: US 8,490,986 B1
(45) Date of Patent: Jul. 23, 2013

(54) STEERING KNUCKLE ASSEMBLY HAVING A KINGPIN

(75) Inventors: Robert Ostrander, Orchard Lake, MI (US); Duy Lam, Baltimore, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 13/472,561

(22) Filed: May 16, 2012

(51) Int. Cl.
*B62D 7/18* (2006.01)

(52) U.S. Cl.
USPC .................................................. 280/93.512

(58) Field of Classification Search
USPC ............. 280/93.51, 93.512, 124.15, 124.125
See application file for complete search history.

(56) References Cited

U.S. PATENT DOCUMENTS

| 5,975,547 | A  | * | 11/1999 | Stroh et al. | 280/93.512 |
|---|---|---|---|---|---|
| 6,029,986 | A  | * | 2/2000 | Bodin et al. | 280/93.512 |
| 6,071,032 | A  |  | 6/2000 | Link | |
| 6,113,118 | A  | * | 9/2000 | Zebolsky | 280/93.512 |
| 6,217,046 | B1 | * | 4/2001 | Bodin et al. | 280/93.512 |
| 6,499,752 | B1 | * | 12/2002 | Davis | 280/93.512 |
| 6,607,203 | B2 | * | 8/2003 | Bodin | 280/93.512 |
| 6,623,019 | B2 | * | 9/2003 | Davis | 280/93.512 |
| 6,827,359 | B2 | * | 12/2004 | Barila | 280/93.512 |
| 7,093,843 | B2 | * | 8/2006 | Varela et al. | 280/93.512 |
| 7,163,217 | B2 | * | 1/2007 | Bodin | 280/93.511 |

* cited by examiner

*Primary Examiner* — Faye M. Fleming
(74) *Attorney, Agent, or Firm* — Brooks Kushman P.C.

(57) ABSTRACT

A steering knuckle assembly for a vehicle. The steering knuckle may include a steering knuckle having first and second holes, first and second bearing assemblies disposed in the first and second holes, respectively, and a kingpin. The kingpin may have first and second end surfaces that are disposed opposite each other and that are received in the first and second bearing assemblies, respectively.

20 Claims, 4 Drawing Sheets

STEERING KNUCKLE ASSEMBLY HAVING A KINGPIN

TECHNICAL FIELD

The present application relates to a steering knuckle assembly for a vehicle that includes a kingpin.

BACKGROUND

A kingpin assembly is disclosed in U.S. Pat. No. 6,071,032.

SUMMARY

In at least one embodiment a steering knuckle assembly is provided. The steering knuckle assembly may include a steering knuckle, first and second bearing assemblies, and a kingpin. The steering knuckle may have a first hole and a second hole. The first and second bearing assemblies may be disposed in the first and second holes, respectively. The kingpin may have first and second end surfaces that may be disposed opposite each other. The first and second end surfaces may be received in and may engage the first and second bearing assemblies such that first and second bearing assemblies exert a compression force against the first and second end surfaces, respectively.

In at least one embodiment a steering knuckle assembly is provided. The steering knuckle assembly may include a steering knuckle, a first bearing assembly, and a kingpin. The steering knuckle may have a first hole. The first bearing assembly may be disposed in the first hole. The kingpin may extend along an axis and may have a first end surface, a second end surface disposed opposite the first end surface, and a lubricant reservoir. The lubricant reservoir may extend along the axis from the first end surface toward the second end surface and may receive a lubricant.

In at least one embodiment a steering knuckle assembly is provided. The steering knuckle assembly may include a steering knuckle, first and second bearing assemblies, and a kingpin. The steering knuckle may have a first hole and a second hole. The first and second bearing assemblies may be disposed in the first and second holes, respectively. The first and second bearing assemblies may each include a cup having a cavity that receives a washer, a set of roller bearings, and a seal assembly. The set of roller bearings may be disposed between the washer and the seal assembly. The kingpin may extend along an axis and through an axle beam. The kingpin may have first and second end surfaces that may be disposed opposite each other and may be received in the first and second bearing assemblies, respectively. The washer in the first bearing assembly may engage the first end surface and the washer in the second bearing assembly may engage the second end surface.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
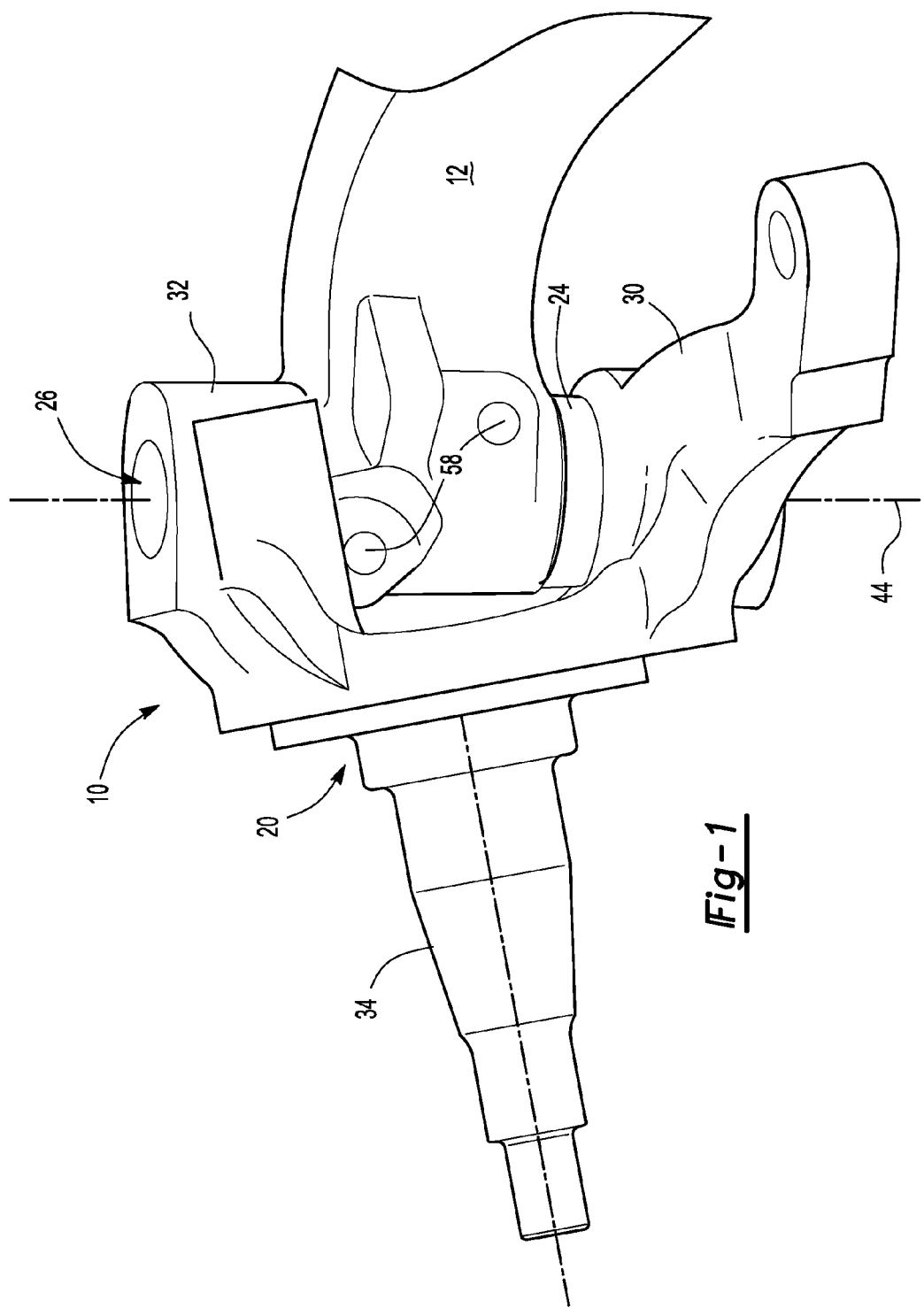
FIG. 1 is a perspective view of an exemplary steering knuckle assembly.
Figure 2:
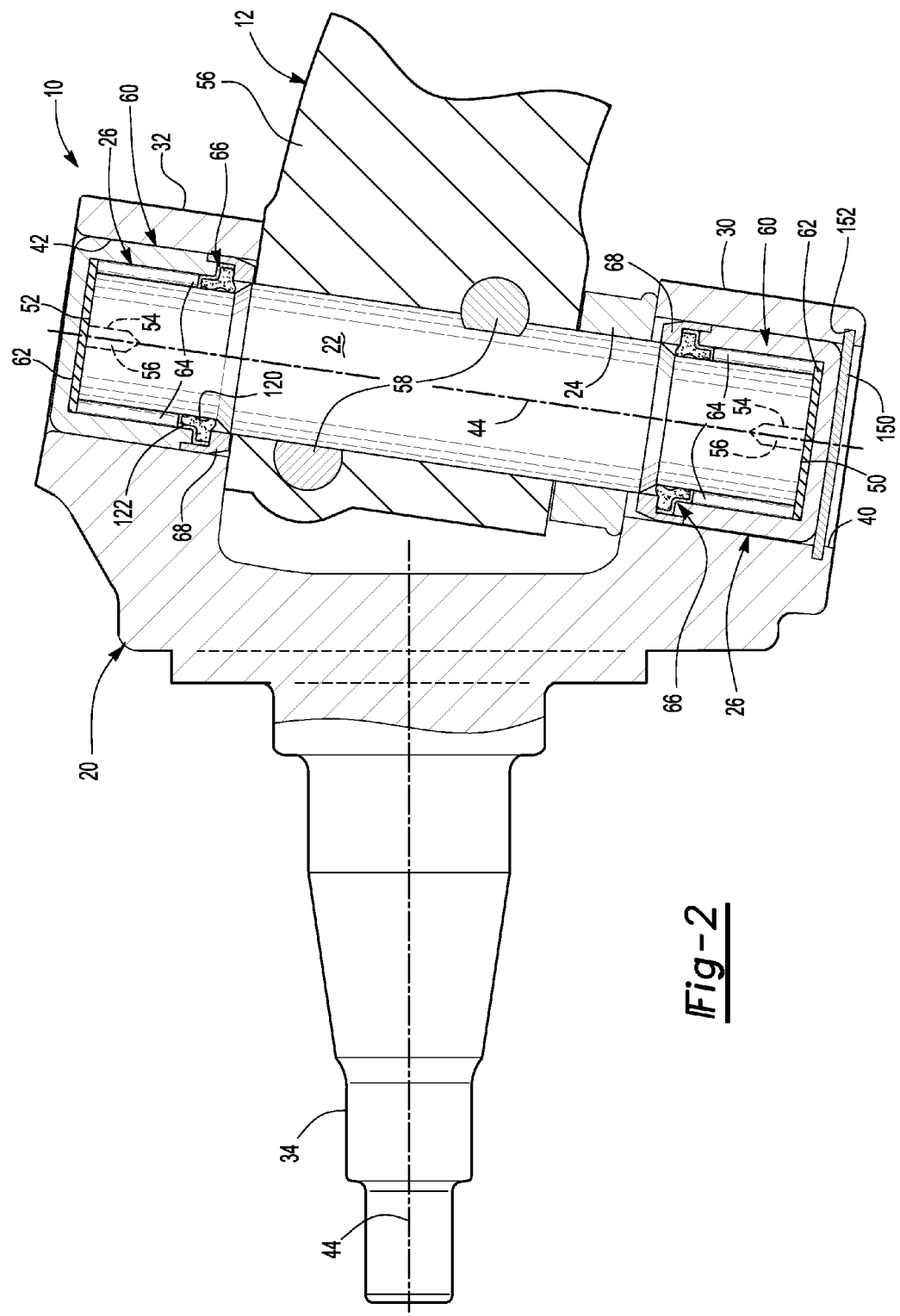
FIG. 2 is a partial section view of the steering knuckle assembly.

Referring to FIGS. 1 and 2, an exemplary steering knuckle assembly 10 is shown. The steering knuckle assembly 10 may be provided with a motor vehicle like a truck, bus, farm equipment, military transport or weaponry vehicle, or cargo loading equipment for land, air, or marine vessels. The steering knuckle assembly 10 may be coupled to an axle beam 12 and may be part of a steering system that may be used to steer or change the direction of the vehicle. In at least one embodiment, the steering knuckle assembly 10 may include a steering knuckle 20, a kingpin 22, a thrust bearing 24, and at least one bearing assembly 26.

The steering knuckle 20 may interconnect the axle beam 12 to a vehicle wheel. In at least one embodiment, the steering knuckle 20 may include a first arm 30, a second arm 32, and a spindle 34.

The first and second arms 30, 32 may be spaced apart from each other and may include first and second holes 40, 42, respectively. The first and second holes 40, 42 may be coaxially disposed or aligned along an axis 44. In addition, the first and second holes 40, 42 may each receive a bearing assembly 26 as will be discussed in more detail below.

The spindle 34 may support a wheel hub assembly that facilitates mounting and rotation of a vehicle wheel. More specifically, the spindle 34 may support one or more wheel bearings that support and facilitate rotation of a vehicle wheel. The spindle 34 may extend along a second axis that extends away from the axle beam 12. The spindle 34 may be integrally formed or cast with the first and second arms 30, 32 such that the steering knuckle 20 is provided as a unitary one-piece component. Alternatively, the spindle 34 may be provided as a separate component that is fastened to the steering knuckle 20 in one or more embodiments.

The kingpin 22 may have a first end surface 50 and a second end surface 52 disposed opposite the first end surface 50. The kingpin 22 may have a generally cylindrical configuration in one or more embodiments. In FIG. 2, the kingpin 22 is not sectioned along axis 44 to better illustrate an exemplary configuration. In addition, the kingpin 22 may or not be tapered or have a smaller outside diameter near the first and/or second end surfaces 50, 52 or in a region disposed in the bearing assembly 26. The kingpin 22 may be centered about and extend along the axis 44 when installed or coupled to the steering knuckle 20. As such, the kingpin 22 may be coaxially disposed with the first and second holes 40, 42.

A lubricant reservoir 54 may be provided at or extend from the first and second end surfaces 50, 52 of the kingpin 22. The lubricant reservoir 54 may be configured as a blind hole and may extend along the axis 44. The lubricant reservoir 54 may receive a lubricant 56, such as grease or oil, which may be used to lubricate components of the bearing assembly 26. In addition, the lubricant reservoir 54 may include a chamfer and/or may act as a pilot hole that may facilitate mounting of the kingpin 22 to a machine tool, such as a lathe, that may be used to remove material or finish at least a portion of the exterior of the kingpin 22.

The kingpin 22 may couple the steering knuckle 20 to the axle beam 12 such that the steering knuckle 20 may pivot about the kingpin 22. More specifically, the kingpin 22 may extend through a hole in the axle beam 12 such that the first end surface 50 of the kingpin 22 is disposed in a bearing assembly 26 that is disposed in the first hole 40 and the second end surface 52 of the kingpin 22 is disposed in a bearing assembly 26 that is disposed in the second hole 42. As is best shown in FIG. 2, one or more draw keys 58 may be provided to secure the kingpin 22 to the axle beam 12. For example, a pair of draw keys 58 may extend through corresponding openings in the axle beam 12 and may engage the kingpin 22 to fixedly position the kingpin 22 with respect to the axle beam 12.

The thrust bearing 24 may be provided between the axle beam 12 and the first arm 30 of the steering knuckle 20. The thrust bearing 24 may extend around the kingpin 22 and may facilitate pivotal movement of the steering knuckle 20.

A bearing assembly 26 may facilitate rotation of the steering knuckle 20 about the axis 44 and with respect to the kingpin 22. In the embodiment shown, a bearing assembly 26 is disposed proximate the first and second ends of the kingpin 22. More specifically, a first bearing assembly 26 may be disposed in the first hole 40 and may receive the first end surface 50 of the kingpin 22 and a second bearing assembly 26 may be disposed in the second hole 42 and may receive the second end surface 52 of the kingpin 22. The first and second bearing assemblies 26 may have the same configuration in one or more embodiments.

Figure 3:
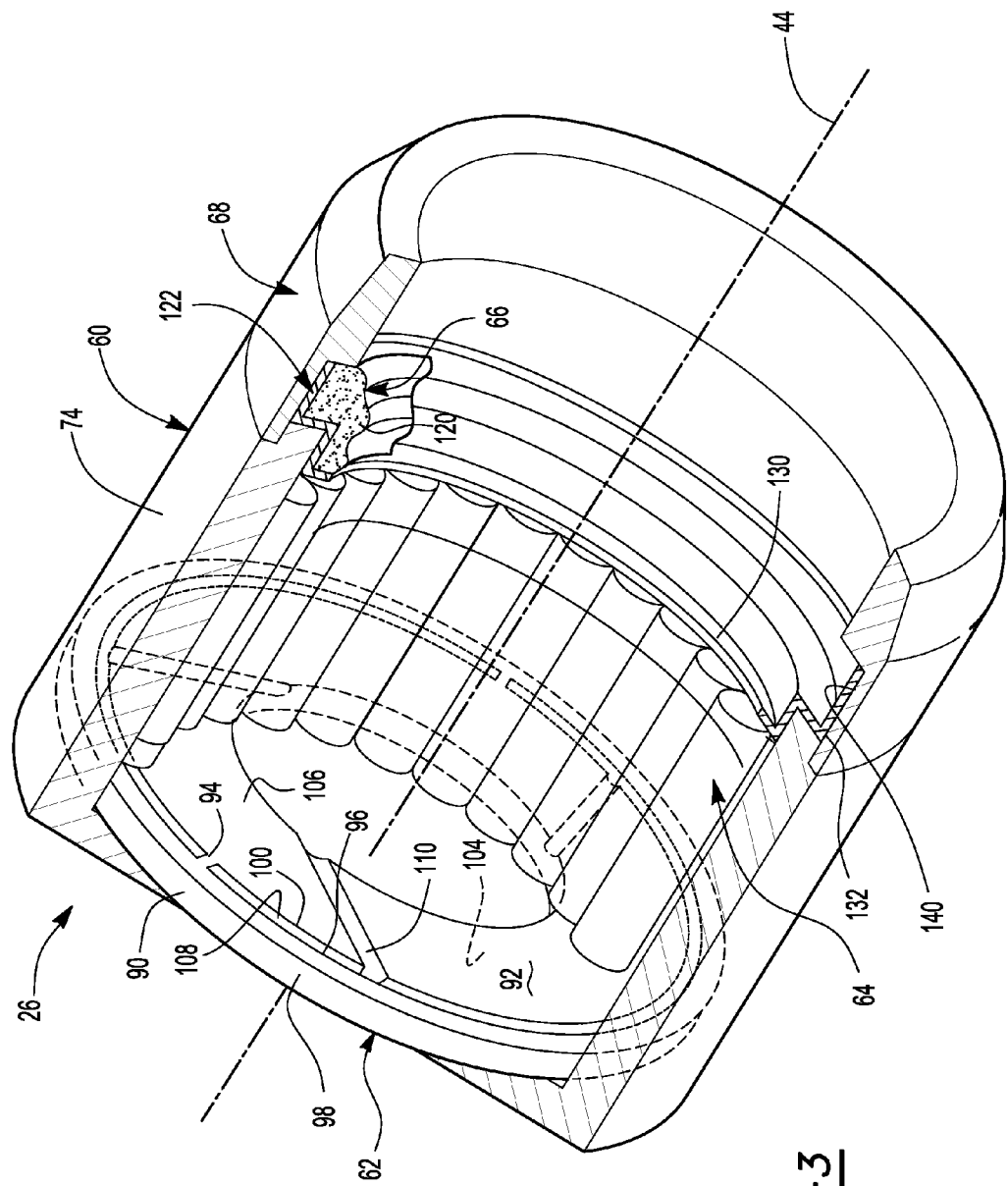
FIG. 3 is a fragmentary perspective view of a bearing assembly that may be provided with the steering knuckle assembly.
Figure 4:
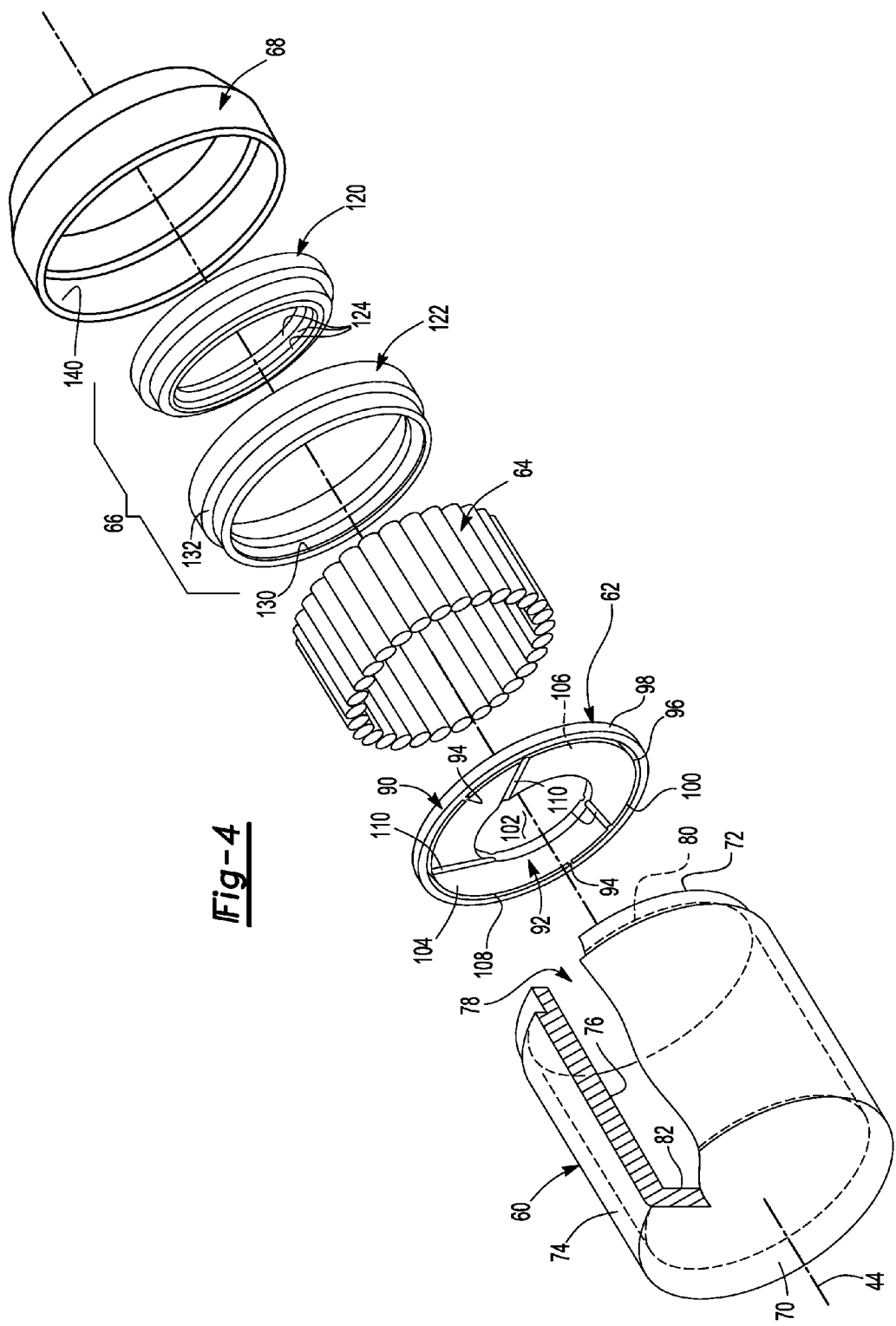
FIG. 4 is an exploded view of the bearing assembly of FIG. 3.

Referring to FIGS. 3 and 4, an exemplary bearing assembly 26 is shown in more detail. The bearing assembly 26 may include a cup 60, a washer 62, a set of roller bearings 64, a seal assembly 66, and a deflector 68.

The cup 60 may receive various components of the bearing assembly 26. In at least one embodiment, the cup 60 may have a generally cylindrical configuration and may have a first surface 70, a second surface 72, a third surface 74, a fourth surface 76, and a cavity 78.

The first and second surfaces 70, 72 may be provided at opposite ends of the cup 60. The first surface 70 may face away from the kingpin 22. The second surface 72 may at least partially define an opening 80 of the cavity 78.

The third surface 74 may extend from the first surface 70 toward or to the second surface 72. At least a portion of the third surface 74 may define an exterior of the cup 60 or an outside circumference of the cup 60. The third surface 74 may engage the steering knuckle 20 in one or more embodiments. In at least one embodiment, the third surface 74 may be tapered or have a reduced diameter near the second surface 72 to facilitate installation of the deflector 68.

The fourth surface 76 may be disposed opposite the third surface 74 and may at least partially define the cavity 78. The fourth surface 76 may extend from the second surface 72 toward the first surface 70 such that a bottom surface or fifth surface 82 is disposed at the end or bottom of the cavity 78. As such, the cavity 78 may be configured as a blind hole in one or more embodiments.

The washer 62 may be disposed in the cavity 78 between the fifth surface 82 and ends of the roller bearings 64. The washer 62 may be made of any suitable material, such as a polymeric material like nylon. In at least one embodiment, the washer 62 may have a first ring 90, a second ring 92, and one or more connection members 94.

The first and second rings 90, 92 may be concentrically disposed such that the first ring 90 extends around the second ring 92. The first ring 90 may include an inside surface 96 or inside circumference that faces the second ring 92 and an outside surface 98 or outside circumference that is disposed opposite the inside surface 96. The outside surface 98 may be disposed proximate and may engage the fourth surface 76 of the cup 60.

The second ring 92 may be disposed inside the first ring 90 and may include an outer surface 100, a center hole 102, a first surface 104, a second surface 106.

The outer surface 100 may face toward the inside surface 96 of the first ring 90. Moreover, the outer surface 100 may be spaced apart from the inside surface 96 such that at least one gap 108 is formed between the inside surface 96 of the first ring 90 and the second surface 106 of the second ring 92 where a connection member 94 is not present.

The center hole 102 may be provided in the center of the second ring 92 and may be disposed adjacent to the lubricant reservoir 54 in the kingpin 22.

The first surface 104 may face toward and engage the fifth surface 82 of the cup 60.

The second surface 106 may be disposed opposite the first surface 104. In addition, the first and second surfaces 104, 106 may be disposed substantially parallel to each other in one or more embodiments.

One or more grooves 110 may be provided in the first and/or second surfaces 104, 106. A groove 110 may extend from the center hole 102 to at least the outer surface 100 and allow lubricant to pass from the lubricant reservoir 54 in the kingpin 22 to at least one gap 108 located between the first and second rings 90, 92. Lubricant may then pass from the gap 108 to the roller bearings 64. In the embodiment shown, multiple grooves 110 are provided in the first and second surfaces 104, 106. Such grooves 110 may be spaced apart from each other and may extend radially or non-radially from the center hole 102 to the outer surface 100. In at least one embodiment, the grooves 110 in the first surface 104 may be offset from or not disposed directly opposite or in alignment with the grooves 110 in the second surface 106 to help improve the strength of the second ring 92 and/or improve lubricant distribution.

At least one connection member 94 may extend between and interconnect the first and second rings 90, 92. For example, a connection member 94 may extend from the inside surface 96 of the first ring 90 to the outer surface 100 of the second ring 92 to connect the first ring 90 to the second ring 92.

The set of roller bearings 64 may be disposed in the cavity 78 of the cup 60. The roller bearings 64 may be disposed between the kingpin 22 and the cup 60 and between the washer 62 and the seal assembly 66. More specifically, the roller bearings 64 may be arranged such that each roller bearing 64 engages and rolls along the fourth surface 76 of the cup 60 and engages an exterior surface of the kingpin 22. The roller bearings 64 may extend substantially parallel to the axis 44. Each roller bearing 64 may have a first end that is disposed adjacent to the washer 62 and a second end that is disposed adjacent to the seal assembly 66, thereby limiting or constraining axial movement of the roller bearings 64. In addition, the lubricant 56 may be provided to the roller bearings 64 to reduce friction.

The seal assembly 66 may include a seal 120 and a seal mounting ring 122. The seal 120 may be generally configured as a ring that may extend completely around the kingpin 22 to help retain lubricant within the cavity 78 of the cup 60 and inhibit contaminants from getting past the seal 120 and entering the cavity 78. The seal 120 may be made of any suitable material, such as rubber or a polymeric material. The seal 120 may include one or more lips 124 that extend toward and engage the kingpin 22. The seal 120 may be overmolded onto a portion of the seal mounting ring 122 in one or more embodiments or may be attached to the seal mounting ring 122 in any suitable manner, such as with an adhesive or mechanical attachment.

The seal mounting ring 122 may support the seal 120. In at least one embodiment, the seal mounting ring 122 may be generally disposed between the roller bearings 64 and the seal 120. The seal mounting ring 122 may have a generally ring-like configuration and may include an inner flange portion 130 and a side wall 132. The inner flange portion 130 may extend toward the axis 44 and may be disposed between the seal 120 and the second end of each roller bearing 64 to help limit axial movement of the roller bearings 64 and to help align and inhibit skewing of the roller bearings 64. As such, the seal mounting ring 122 may cooperate with the cup 60 to help avoid end loading of the roller bearings 64 that may reduce roller bearing life. The side wall 132 may extend from an end of the inner flange portion 130 and may be disposed between the seal 120 and the cup 60 and/or between the seal 120 and the deflector 68.

The deflector 68 may be provided to help keep contaminants away from the seal assembly 66. In at least one embodiment, the deflector 68 may be generally configured as a ring that extends around the kingpin 22. The deflector 68 may be mounted to the cup 60 in any suitable manner. For example, the deflector 68 may engage the second surface 72 of the cup 60 and may have a mating portion 140 that may have an enlarged inside diameter that fits over a portion of the cup 60 to secure the deflector 68.

The bearing assembly 26 may be fixedly disposed on the steering knuckle 20, such as by press fitting a bearing assembly 26 into a corresponding hole 40, 42 and/or by securing the bearing assembly 26 to the steering knuckle 20 with a fastener, such as a snap ring 150 (shown in FIG. 2) that may be received in a snap ring groove 152 that may be provided in the steering knuckle 20. The snap ring 150 may engage and inhibit movement of an associated bearing assembly 26 along the axis 44 in at least one direction. In FIG. 2, a snap ring 150 is shown in the first hole 40 but could also be provided with the second hole 42 or may be omitted from both the first and second holes 40, 42 in one or more embodiments.

The bearing assembly 26 may cooperate with the kingpin 22 to help reduce steering oscillations that may be transmitted from the vehicle wheels to the steering wheel, resulting in steering wheel shimmy. For example, the bearing assemblies 26 may be installed such that a compression force is exerted upon the first and second end surfaces 50, 52 of the kingpin 22. Such a compression force may be provided when the snap ring 150 is installed or when one or more bearing assemblies 26 are press fit against the kingpin 22. Under compression, the washer 62 in the bearing assembly 26 located in the first hole 40 may engage the first end surface 50 of the kingpin 22 while the washer 62 of the bearing assembly 26 located in the second hole 42 may engage the second end surface 52 of the kingpin 22. Engagement of the kingpin 22 and the washer 62 may reintroduce or provide additional friction into the connection between the kingpin 22 and the steering knuckle 20 that may help reduce wheel shimmy without the use of an exotic or more expensive and/or complex thrust bearing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A steering knuckle assembly comprising:
   a steering knuckle having a first hole and a second hole;
   first and second bearing assemblies disposed in the first and second holes, respectively; and
   a kingpin having first and second end surfaces that are disposed opposite each other;
   wherein the first and second end surfaces are received in and engage the first and second bearing assemblies such that first and second bearing assemblies exert a compression force against the first and second end surfaces, respectively.

2. The steering knuckle assembly of claim 1 wherein an axle beam is fixedly disposed on the kingpin.

3. The steering knuckle assembly of claim 1 wherein the compression force reduces steering wheel shimmy.

4. The steering knuckle assembly of claim 1 wherein the steering knuckle further comprises a snap ring groove disposed in the first hole and wherein a snap ring is disposed in the snap ring groove and compresses the first bearing assembly toward the second bearing assembly.

5. The steering knuckle assembly of claim 1 wherein the first bearing assembly includes a cup that defines a cavity, wherein the first end surface is disposed in the cavity.

6. The steering knuckle assembly of claim 5 wherein the cavity is configured as a blind hole and wherein a washer is disposed between the first end surface and the cup.

7. The steering knuckle assembly of claim 6 wherein the first bearing assembly further comprises a seal assembly disposed proximate an opening of the cavity and a set of roller bearings that extend from the washer to the seal assembly.

8. The steering knuckle assembly of claim 7 wherein the seal assembly includes a seal mounting ring that is disposed adjacent to members of the set of roller bearings, wherein the seal mounting ring and washer cooperate to help align the members of the set of bearings.

9. The steering knuckle assembly of claim 7 further comprising a deflector that is disposed proximate the seal assembly and extends around the kingpin.

10. A steering knuckle assembly comprising:
    a steering knuckle having a first hole;
    a first bearing assembly disposed in the first hole; and
    a kingpin that extends along an axis, the kingpin including:
       a first end surface and a second end surface disposed opposite the first end surface, and
       a lubricant reservoir that extends along the axis from the first end surface toward the second end surface and that receives a lubricant.

11. The steering knuckle assembly of claim 10 wherein the first bearing assembly includes a cup that at least partially defines a cavity that receives a washer, wherein the washer engages the first end surface.

12. The steering knuckle assembly of claim 11 wherein the washer includes a first ring and a second ring, wherein the first and second rings are concentrically disposed such that a gap is provided between the first and second rings.

13. The steering knuckle assembly of claim 12 wherein the second ring includes a center hole disposed proximate the lubricant reservoir and at least one groove that extends from the center hole to the gap.

14. The steering knuckle assembly of claim 13 wherein the second ring includes a first surface and a second surface disposed opposite the first surface, wherein the at least one groove is provided in the first and second surfaces.

15. The steering knuckle assembly of claim 13 further comprising a set of roller bearings that are disposed in the cavity adjacent to the washer and that engage the kingpin to permit the steering knuckle to rotate about the axis, wherein the groove permits lubricant to flow from the lubricant reservoir to the gap and wherein lubricant flows from the gap to the set of roller bearings.

16. A steering knuckle assembly comprising:
a steering knuckle having a first hole and a second hole;
first and second bearing assemblies disposed in the first and second holes, respectively, wherein the first and second bearing assemblies each have a cup having a cavity that receives a washer, a set of roller bearings, and a seal assembly, wherein the set of roller bearings are disposed between the washer and the seal assembly; and
a kingpin that extends along an axis and through an axle beam, the kingpin having first and second end surfaces that are disposed opposite each other and that are received in the first and second bearing assemblies, respectively;
wherein the washer in the first bearing assembly engages the first end surface and the washer in the second bearing assembly engages the second end surface.

17. The steering knuckle assembly of claim 16 wherein the cup has a first surface, a second surface disposed opposite the first surface, a third surface that extends from the first surface to the second surface, and a fourth surface disposed opposite the third surface that extends from the first surface toward the second surface to at least partially define the cavity.

18. The steering knuckle assembly of claim 17 wherein the cup further comprises a fifth surface disposed at a bottom of the hole, wherein the washer has a first surface that engages the fifth surface and a second surface disposed opposite the first surface that engages the kingpin.

19. The steering knuckle assembly of claim 17 wherein a snap ring engages the second surface.

20. The steering knuckle assembly of claim 17 wherein the first and second bearing assemblies each have a deflector disposed proximate the second and third surfaces of the cup and that engages the seal assembly.

* * * * *